United States Patent
Nakamoto

(10) Patent No.: US 9,921,595 B2
(45) Date of Patent: Mar. 20, 2018

(54) CIRCUIT FOR GENERATING STEPPED-DOWN VOLTAGE

(71) Applicant: FUJITSU LIMITED, Kawasaki-shi, Kanagawa (JP)

(72) Inventor: Hiroyuki Nakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 15/062,466

(22) Filed: Mar. 7, 2016

(65) Prior Publication Data

US 2016/0187905 A1 Jun. 30, 2016

Related U.S. Application Data

(63) Continuation of application No. PCT/JP2013/076135, filed on Sep. 26, 2013.

(51) Int. Cl.
| | |
|---|---|
| *G05F 1/575* | (2006.01) |
| *G05F 1/56* | (2006.01) |
| *H02J 7/00* | (2006.01) |
| *H02M 3/158* | (2006.01) |

(52) U.S. Cl.
CPC ............... *G05F 1/575* (2013.01); *G05F 1/56* (2013.01); *H02J 7/0065* (2013.01); *H02M 3/158* (2013.01)

(58) Field of Classification Search
CPC . G05F 1/575; G05F 1/56; G05F 1/565; G05F 1/573; G05F 1/569; G05F 1/5735; G05F 1/567; G05F 1/445; G05F 1/46; H02M 3/156; H02M 3/33507; H02M 3/33515; H02M 3/073; H02M 2001/0045
USPC ................................................. 323/273–281
See application file for complete search history.

(56) References Cited

U.S. PATENT DOCUMENTS

| | | |
|---|---|---|
| 5,861,771 A | 1/1999 | Matsuda et al. |
| 2008/0012543 A1 | 1/2008 | Negoro |
| 2011/0062921 A1 | 3/2011 | Sudou |

(Continued)

FOREIGN PATENT DOCUMENTS

| | | |
|---|---|---|
| JP | 10-133754 | 5/1998 |
| JP | 2004-280704 | 10/2004 |

(Continued)

OTHER PUBLICATIONS

International Search Report mailed in connection with PCT/JP2013/076135 and dated Dec. 24, 2013 (1 page).

*Primary Examiner* — Jue Zhang
*Assistant Examiner* — Kevin H Sprenger
(74) *Attorney, Agent, or Firm* — Fujitsu Patent Center

(57) ABSTRACT

A circuit includes a PMOS transistor having a source coupled to an input node and a drain coupled to an output node, a control circuit operating with a voltage of an internal line to control a gate voltage of the PMOS transistor, a comparator operating with the voltage of the internal line to cause a comparator output to change from a first state to a second state in response to a drop of voltage of the input node, a switch circuit configured to connect the input node to the internal line when the comparator output is in the first state, and to connect the output node to the internal line when the comparator output is in the second state, and a block circuit configured to block a path from the output node to the input node through the PMOS transistor when the comparator output is in the second state.

5 Claims, 11 Drawing Sheets

(56) References Cited

U.S. PATENT DOCUMENTS

| | | | | |
|---|---|---|---|---|
| 2012/0262224 A1* | 10/2012 | Shao | ............... | H02M 3/073 327/536 |
| 2014/0062443 A1* | 3/2014 | Stanzione | ............ | H02M 3/156 323/284 |
| 2015/0207411 A1* | 7/2015 | Calhoun | ............... | H02M 1/088 323/235 |

FOREIGN PATENT DOCUMENTS

| | | |
|---|---|---|
| JP | 2006-228027 | 8/2006 |
| JP | 2007-316954 | 12/2007 |
| JP | 2008-021166 | 1/2008 |
| JP | 2009-301209 | 12/2009 |
| JP | 2011-065634 | 3/2011 |

\* cited by examiner

US 9,921,595 B2

CIRCUIT FOR GENERATING STEPPED-DOWN VOLTAGE

CROSS-REFERENCE TO RELATED APPLICATIONS

This application is a continuation application of International Application PCT/JP2013/076135 filed on Sep. 26, 2013 and designated the U.S., the entire contents of which are incorporated herein by reference.

FIELD

The disclosures herein relate to a step-down converter circuit, a power supply module, and a method of controlling a step-down converter circuit.

BACKGROUND

Semiconductor integrated circuits used in portable electronic equipment such as portable phones include a step-down converter circuit for lowering a voltage from a lithium secondary battery to a standard power supply voltage applicable to integrated circuits such as a microcomputer, a memory, a radio circuit, etc. Examples of such a step-down converter circuit include a switching regulator (i.e., DC-DC converter), an LDO (i.e., low drop out) regulator, etc. In the case of the voltage of a lithium secondary battery being 4 V and the operating voltage of a microcomputer being 1 V, a step-down converter circuit may be configured to receive an input voltage (VIN) of 4 V and to produce an output voltage (VOUT) of 1 V.

In recent years, efforts have been directed to the development of technologies such as energy harvesting that allow electronic equipment to operate with small electronic power extracted from the surrounding environment by utilizing environment power generation devices. Power generated by an energy harvester typically fluctuates depending on the ambient conditions. A photovoltaic cell for converting solar light into electrical power, for example, has the power generation capacity thereof fluctuating depending on the hour and the weather conditions. In order to operate electronic equipment in a stable manner, it is thus preferable to accumulate power generated by an energy harvester in a storage device such as a lithium secondary battery or the like and to operate electronic equipment with the power retrieved from the storage device. In a preferable configuration, the fluctuating voltage of the energy harvester may be supplied as an input voltage VIN to a step-down converter circuit. The step-down converter circuit regulates the output voltage VOUT to keep this voltage within the range of the standard power supply voltage of the storage device while charging the lithium secondary battery or the like. A step-down converter circuit may be used in the situation in which the condition of VIN>VOUT is not guaranteed. In some cases, the voltage condition of VIN<VOUT may occur.

FIG. 1 is a drawing illustrating a problem arising when the condition of VIN<VOUT occurs with respect to a conventional step-down converter circuit. A conventional switching regulator has a PMOS transistor situated between the input terminal (i.e., power supply terminal) and the output terminal, and also has an NMOS transistor between the output terminal and the ground. An LDO regulator has a PMOS transistor between the input terminal (i.e., power supply terminal) and the output terminal. FIG. 1 illustrates the structure of a PMOS transistor that is disposed between the input terminal (i.e., power supply terminal) and the output terminal of a switching regulator or an LDO regulator.

The PMOS transistor includes a p-type substrate 10, an n-well 11, an n-well 12, a source (p-type diffusion layer) 13, a drain (p-type diffusion layer) 14, and a gate 15. The input voltage (power supply voltage) VIN is applied to the n-wells 11 and 12 and to the source 13. Further, the voltage of the drain 14 serves as the output voltage VOUT.

The input voltage applied to a conventional step-down converter circuit may drop below the output voltage thereof. Namely, the condition of VIN<VOUT may occur. In such a case, the pn-junction diode between the drain 14 and the back gate (i.e., n-well 12) becomes conductive, so that the electric charge accumulated in the VOUT is discharged toward VIN through this diode. It may further be noted that the gate 15 is coupled to the highest potential, i.e., VIN, in order to ensure the nonconductive state of the PMOS transistor. In the case of VIN<VOUT, however, the gate voltage (i.e., VIN) is lower than the drain voltage (i.e., VOUT), so that electric charge is discharged from VOUT to VIN through a channel formed between the drain 14 and the source 13. In this manner, the condition of VIN<VOUT causes electric current to flow back from VOUT to VIN, thereby creating a risk of discharging the accumulated electric charge of a lithium secondary battery or the like.

The following mechanisms may thus be desired in the step-down converter circuit coupled to a power supply voltage that fluctuates as in the case of energy harvesting. A desired mechanism prevents electric current from flowing back from the output side to the input side or from the output side to the ground through a transistor or a control circuit that controls whether to turn on or off the transistor, even when the condition of VIN<VOUT occurs. Further, a desired mechanism ensures the reliable operation of the control circuit, thereby preventing the operation of the control circuit from becoming unstable due to a drop in the power supply voltage, even when the condition of VIN<VOUT occurs.

FIG. 2 is a drawing illustrating an example of the power supply unit that has a reverse-flow preventing mechanism for preventing reverse-flow current. This power supply unit relates to the disclosures of Patent Document 1. In this circuit, an error amplifier 133 detects an occurrence of the condition of VIN<VOUT to turn off a transistor M6 and turn on transistors M7 and M8. The "off" state of M6 breaks the path through which reverse-flow current occurs from the drain of the transistor M1 to VIN through the back gate. The "on" state of M7 couples the gate of the transistor M1 to VOUT being a higher potential, thereby preventing a channel from being formed between the drain and the source. Further, the "on" state of M8 turns off transistors M2 and M3 to power down the error amplifier 133.

Due to the fact that the power voltage of the error amplifier 133 is VIN, however, the fluctuation of VIN may cause the operation of the error amplifier 133 to become unstable. VIN situated in the voltage range (e.g., below 1 V) in which the error amplifier 133 does not properly operate may result in failure to ensure the reliable control of the transistors M6 through M8. Further, the configuration illustrated in FIG. 2 may end up allowing electric current to leak from VOUT to the ground through the transistor M8, the transistor M5, and a current source 141.

Study has also been made with respect to configurations in which the back gate and the gate of a transistor are coupled to VOUT in response to detecting the condition of VIN<VOUT, thereby preventing reverse-flow current from VOUT to VIN (see Patent Documents 2 through 5, for example). The configuration relating to the disclosures of Patent Document 2 has circuits such as a comparator thereof coupled to a power supply voltage VIN. A drop in VIN (e.g., dropping below 1 V) may result in failure to ensure the reliable "on/off" control of transistors. Further, there may be a possibility of electric current leaking from VOUT to the ground through the control circuit.

With respect to the configuration relating to the disclosures of Patent Document 3, it is not clear as to where the power supply of a reverse-flow detecting circuit is connected to. It may not be clear as to whether the reverse-flow detecting circuit operates in a stable manner in the case of the dropping of VIN below 1 V, for example. Further, since the power supply VIN is applied to part of the reverse-flow detecting circuit, such a configuration may result in failure to ensure the reliable outputting of a control signal to a transistor or the like.

The configuration relating to the disclosures of Patent Document 4 has an error amplifier whose power supply is coupled to VIN. A drop of VIN (e.g., dropping below 1 V) may thus give rise to a possibility of electric current flowing back from VOUT to VIN through a back gate from the drain of the PMOS transistor situated at the output stage of the error amplifier.

The configuration relating to the disclosures of Patent Document 5 has two diodes whose anodes are coupled to VIN and VOUT, respectively, and whose cathodes are coupled to each other to serve as electric power applied to a control circuit inclusive of a comparator. This arrangement may prevent reverse-flow current through the control circuit. However, the power supply voltage of the driver for controlling an output transistor is also lowered due to a voltage drop by the diodes, thereby giving rise to a problem in that the electric power conversion efficiency of the power supply circuit (i.e., ratio of power consumption to power supply) may deteriorate.

[Patent Document 1] Japanese Laid-open Patent Publication No. 2006-228027
[Patent Document 2] Japanese Laid-open Patent Publication No. 2007-316954
[Patent Document 3] Japanese Laid-open Patent Publication No. 2009-301209
[Patent Document 4] Japanese Laid-open Patent Publication No. 2011-65634
[Patent Document 5] Japanese Laid-open Patent Publication No. 2008-21166

SUMMARY

According to an aspect of the embodiment, a circuit for generating a stepped-down voltage includes a first PMOS transistor having a source node thereof coupled to a voltage input node, and having a drain node thereof coupled to a voltage output node, a control circuit configured to operate with a voltage of an internal voltage line and to control a gate voltage of the first PMOS transistor, a comparator configured to operate with the voltage of the internal voltage line and to cause an output thereof to change from a first state to a second state in response to a drop of voltage of the voltage input node, a switch circuit configured to connect the voltage input node to the internal voltage line when the output of the comparator is in the first state, and configured to connect the voltage output node to the internal voltage line when the output of the comparator is in the second state, and a block circuit configured to block a reverse-flow path from the voltage output node to the voltage input node through the first PMOS transistor when the output of the comparator is in the second state.

According to an aspect of the embodiment, a power supply module includes an energy harvester, a circuit configured to receive a voltage generated by the energy harvester at a voltage input node and to generate a stepped-down voltage at a voltage output node by stepping down a voltage of the voltage input node, a storage device coupled to the voltage output node, wherein the circuit includes a PMOS transistor having a source node thereof coupled to the voltage input node, and having a drain node thereof coupled to the voltage output node, a control circuit configured to operate with a voltage of an internal voltage line and to control a gate voltage of the PMOS transistor, a comparator configured to operate with the voltage of the internal voltage line and to cause an output thereof to change from a first state to a second state in response to a drop of voltage of the voltage input node, a switch circuit configured to connect the voltage input node to the internal voltage line when the output of the comparator is in the first state, and configured to connect the voltage output node to the internal voltage line when the output of the comparator is in the second state, and a block circuit configured to block a reverse-flow path from the voltage output node to the voltage input node through the PMOS transistor when the output of the comparator is in the second state.

According to an aspect of the embodiment, a method of controlling a circuit for generating a stepped-down voltage which includes a first PMOS transistor having a source node thereof coupled to a voltage input node, and having a drain node thereof coupled to a voltage output node, a control circuit configured to operate with a voltage of an internal voltage line and to control a gate voltage of the first PMOS transistor, a comparator configured to operate with the voltage of the internal voltage line and to cause an output thereof to change from a first state to a second state in response to a drop of voltage of the voltage input node, and a switch circuit configured to connect a selected one of the voltage input node and the voltage output node to the internal voltage line, the method including connecting the voltage input node to the internal voltage line through the switch circuit when the output of the comparator is in the first state, connecting the voltage output node to the internal voltage line through the switch circuit when the output of the comparator is in the second state, and blocking a reverse-flow path from the voltage output node to the voltage input node through the PMOS transistor when the output of the comparator is in the second state.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings.

Figure 1:
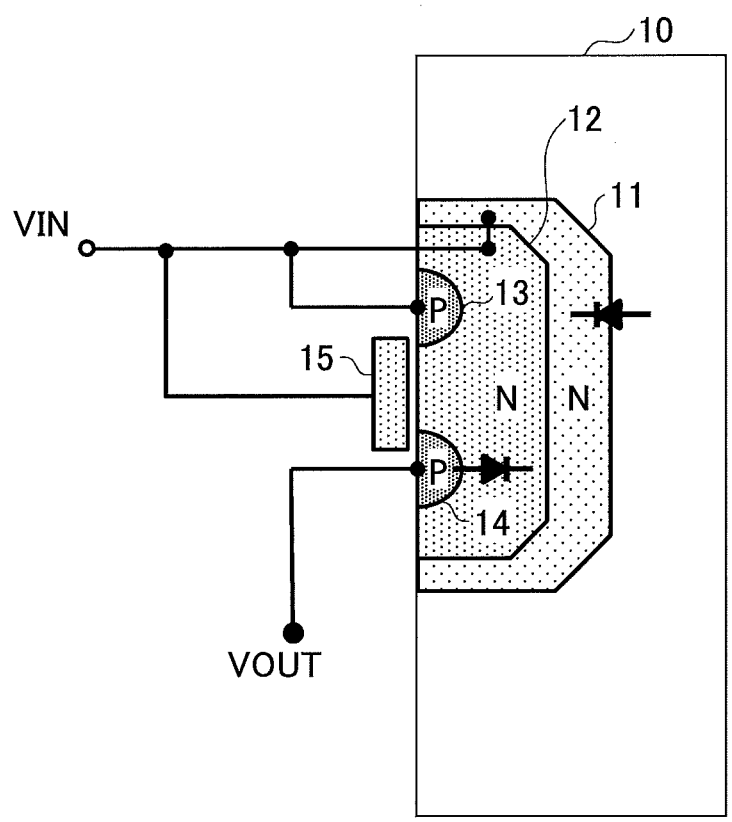
FIG. 1 is a drawing illustrating a problem arising when the condition of VIN<VOUT occurs with respect to a conventional step-down converter circuit.
Figure 2:
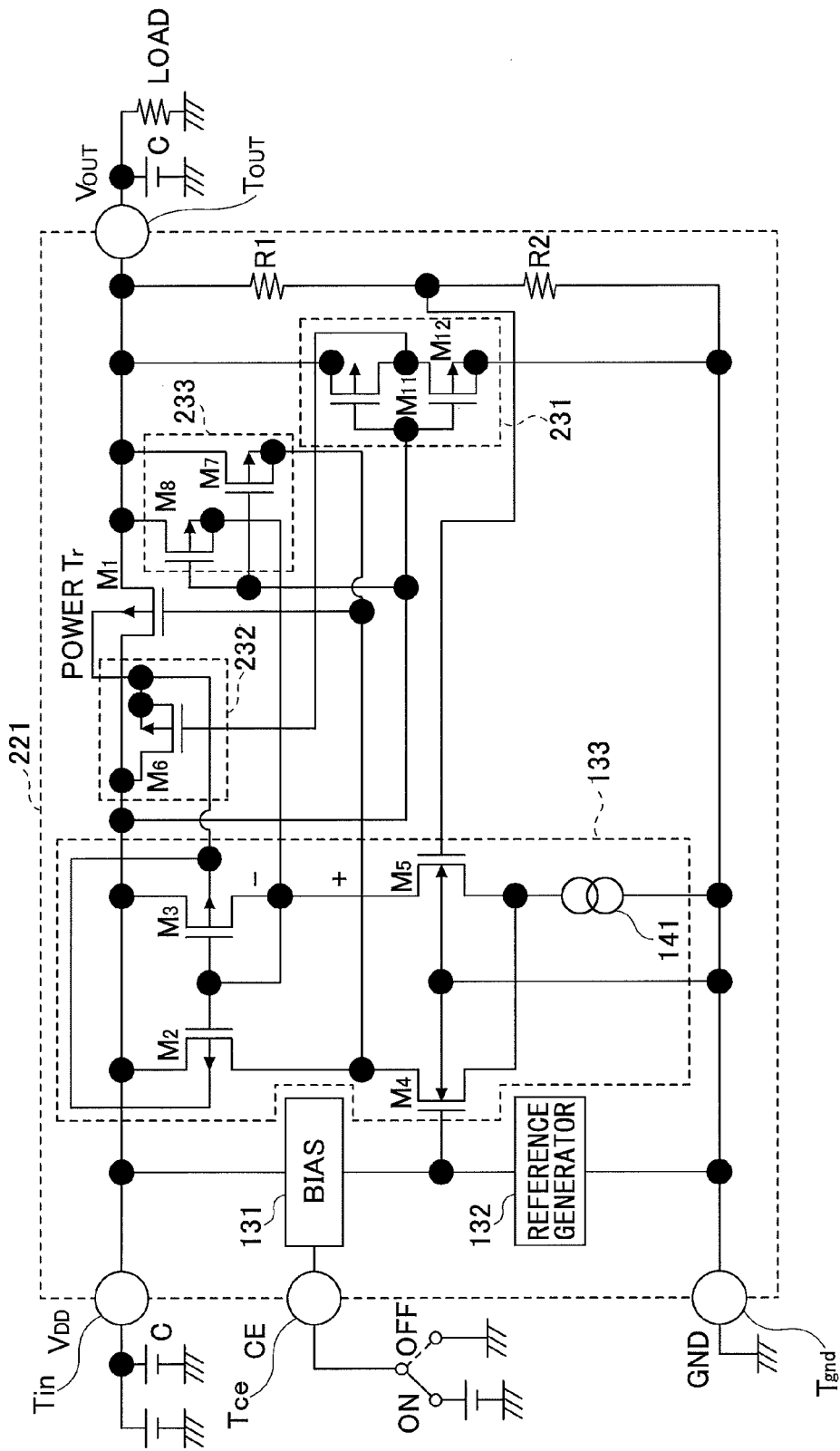
FIG. 2 is a drawing illustrating an example of a power supply unit that has a reverse-flow preventing mechanism for preventing the reverse-flow of current.
Figure 3:
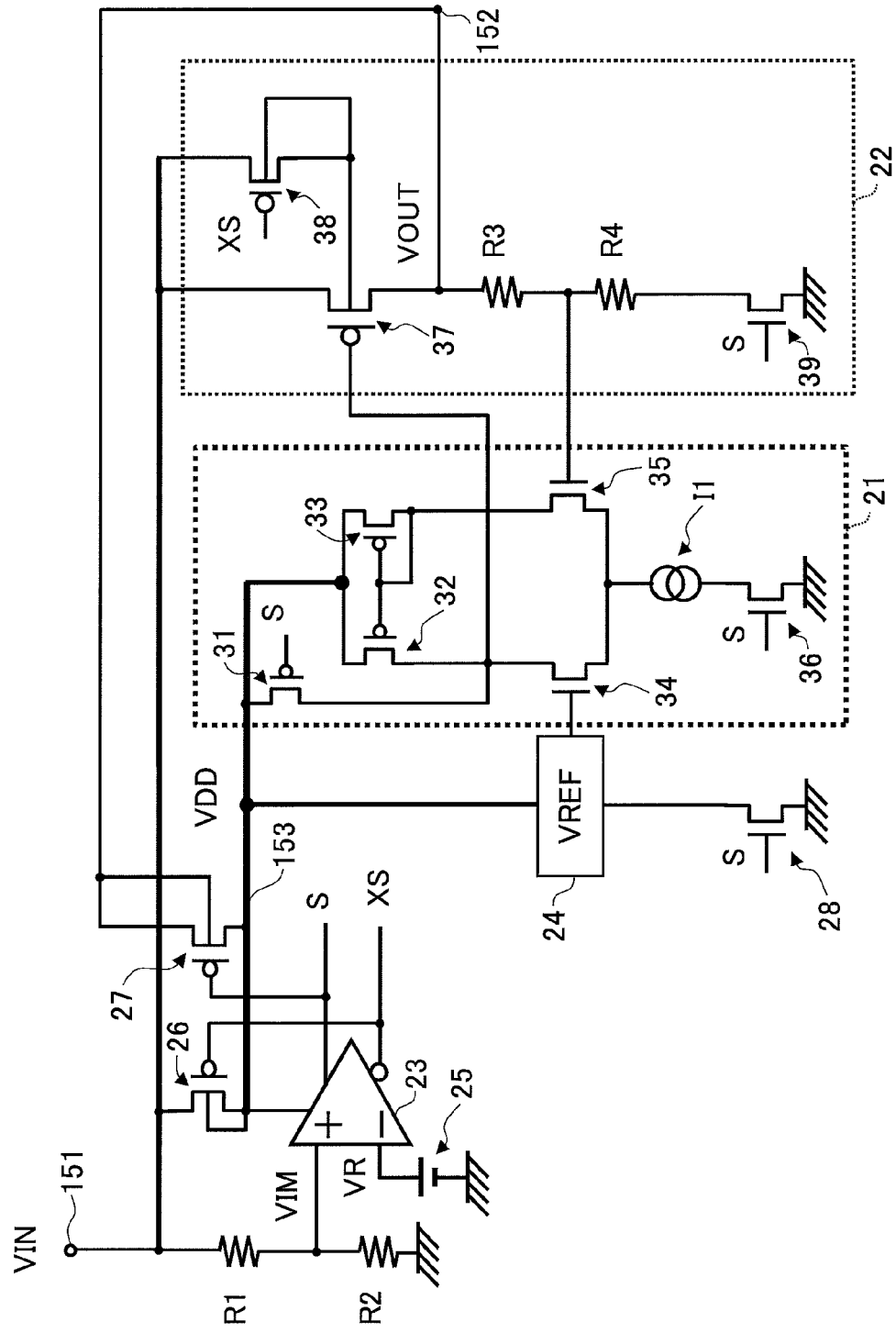
FIG. 3 is a drawing illustrating an example of the configuration of a step-down converter circuit according to a first embodiment.

FIG. 3 is a drawing illustrating an example of the configuration of a step-down converter circuit according to a first embodiment. A step-down converter circuit 20 illustrated in FIG. 3 includes a control circuit 21, an output circuit 22, a comparator 23, a reference-voltage generating circuit 24, a reference voltage source 25, PMOS transistors 26 and 27, an NMOS transistor 28, and resistor elements R1 and R2. The control circuit 21 includes PMOS transistors 31 through 33, NMOS transistors 34 through 36, and a current source I1. The output circuit 22 includes PMOS transistors 37 and 38, an NMOS transistor 39, and resistive elements R3 and R4.

The PMOS transistor 37 has the source node thereof coupled to a voltage input node 151, and has the drain node thereof coupled to a voltage output node 152. The back-gate node of the PMOS transistor 37 is coupled to the voltage input node 151 through the PMOS transistor 38.

The comparator 23 operates with the voltage VDD of an internal voltage line 153, and changes its outputs S and XS from a first state to a second state in response to a drop in the voltage VIN at the voltage input node 151. Specifically, the comparator 23 compares a voltage VR of the reference voltage source 25 with a voltage VIM obtained by dividing the voltage VIN of the voltage input node 151 by use of the resistor elements R1 and R2. The comparator 23 sets the outputs S and XS to the first state in the case of VIM being higher than VR, and sets the outputs S and XS to the second states in the case of VIM being lower than VR. In the first states, the output S is set to HIGH, and the output XS is set to LOW. In the second states, the output S is set to LOW, and the output XS is set to HIGH.

The PMOS transistor 26 has the source node thereof coupled to the voltage input node 151, and has the drain node and back-gate node thereof coupled to the internal voltage line 153, with the gate node thereof being coupled to the output XS of the comparator 23. The PMOS transistor 27 has the source node and back-gate node thereof coupled to the voltage output node 152, and has the drain node thereof coupled to the internal voltage line 153, with the gate node thereof being coupled to the output S of the comparator 23 that is the inversion of the output XS.

The PMOS transistors 26 and 27 serve as a switch circuit which couples the voltage input node 151 to the internal voltage line 153 upon the outputs S and XS being in the first state, and couples the voltage output node 152 to the internal voltage line 153 upon the outputs S and XS being in the second state. Accordingly, the comparator 23, the reference-voltage generating circuit 24, and the control circuit 21 operate with the power voltage that is the voltage VIN from the voltage input node 151 when the outputs S and XS of the comparator 23 are in the first state. Further, the comparator 23, the reference-voltage generating circuit 24, and the control circuit 21 receive the power voltage that is the voltage VOUT from the voltage output node 152 when the outputs S and XS of the comparator 23 are in the second state. With this arrangement, an appropriate voltage level is ensured as the power voltage of the comparator 23, thereby guaranteeing a stable comparison operation of the comparator 23.

In the case of the outputs S and XS of the comparator 23 being in the second state, the NMOS transistors 28 and 36 receiving the output S at the gates thereof become nonconductive, so that the reference-voltage generating circuit 24 and the control circuit 21 halt their operations. Further, the NMOS transistor 39 receiving the output S of the comparator 23 at the gate thereof becomes nonconductive, so that the path in the output circuit 22 between the voltage output node 152 and the ground is disconnected.

The control circuit 21 operates with the voltage VDD of the internal voltage line 153 to control the gate voltage of the PMOS transistor 37. Specifically, a circuit part constituted by the PMOS transistors 32 and 33, the NMOS transistors 34 through 36, and a current source I1 serves as a differential amplifier in the case of the outputs S and XS of the comparator 23 being in the first state. This differential amplifier compares the reference voltage of the reference-voltage generating circuit 24 with the voltage obtained by dividing the voltage VOUT of the voltage output node 152 by use of the resistor elements R3 and R4, thereby controlling the gate voltage of the PMOS transistor 37 in response to the difference between these compared voltages. Namely, the control circuit 21 performs the feedback control of the gate voltage of the PMOS transistor such that the divided voltage obtained by the resistor elements R3 and R4 becomes equal to the reference voltage of the reference-voltage generating circuit 24. With this arrangement, the voltage VOUT of the voltage output node 152 is adjusted to a desired voltage level (i.e., constant voltage level).

The outputs S and XS of the comparator 23 in the second state cause the PMOS transistor 31 and the PMOS transistor 38 to be conductive and nonconductive, respectively. This breaks the reverse-flow path extending from the voltage output node 152 to the voltage input node 151 through the PMOS transistor 37. Namely, the PMOS transistor 31 and the PMOS transistor 38 serve as a block circuit that blocks the reverse-flow path extending from the voltage output node 152 to the voltage input node 151 through the PMOS transistor 37. In the circuit configuration illustrated in FIG. 3, the PMOS transistor 31 is disposed as part of the control circuit 21, and the PMOS transistor 38 is disposed as part of the output circuit 22. Such arrangements are made only for the purposes of convenience. The PMOS transistor 31 and the PMOS transistor 38 may be regarded as a block circuit that is separate and distinct from the control circuit 21 and the output circuit 22.

Figure 4:
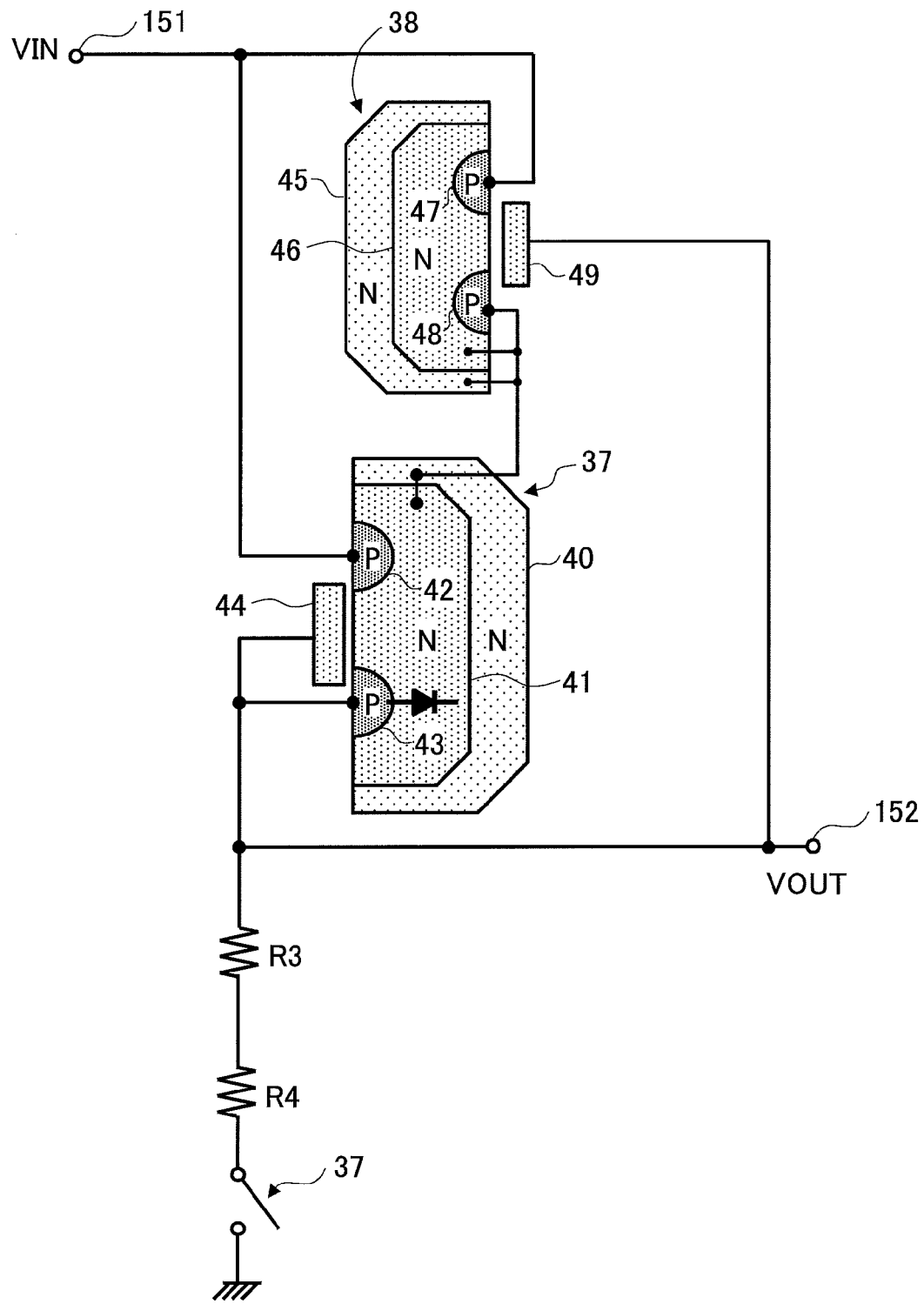
FIG. 4 is a drawing illustrating the state in which the reverse-flow path extending from a voltage output node to a voltage input node through a PMOS transistor is blocked.

FIG. 4 is a drawing illustrating the state in which the reverse-flow path extending from the voltage output node 152 to the voltage input node 151 through the PMOS transistor 37 is blocked. In FIG. 4, the illustration of a p-type substrate is omitted for the sake of convenience. The PMOS transistor 37 includes an n-well 40, an n-well 41, a source (p-type diffusion layer) 42, and a drain (p-type diffusion layer) 43 formed in a p-type substrate, and also includes a gate 44. The PMOS transistor 38 includes an n-well 45, an n-well 46, a source (p-type diffusion layer) 47, and a drain (p-type diffusion layer) 48 formed in the p-type substrate, and also includes a gate 49.

FIG. 4 illustrates the state of the PMOS transistor 37 and the PMOS transistor 38 in the case of the outputs S and XS of the comparator 23 being in the second state. With the outputs S and XS of the comparator 23 (see FIG. 3) being in the second state, the gate voltage of the PMOS transistor 37 and the gate voltage of the PMOS transistor 38 are both set to the voltage VOUT.

The gate voltage of the PMOS transistor 38 set in the voltage VOUT causes the PMOS transistor 38 to be nonconductive. This arrangement blocks the path through which electric current flows back from the drain of the PMOS transistor 37 to the voltage input node 151 through the pn junction made by the drain 43 and the n-well 41 of the PMOS transistor 37 and through the PMOS transistor 38. Namely, this breaks (blocks) the first reverse-flow path extending from the voltage output node 152 to the voltage input node 151 through the PMOS transistor 37.

Further, the gate voltage of the PMOS transistor 37 set in the voltage VOUT causes a channel between the source 42 connected to the voltage VIN and the drain 43 connected to the voltage VOUT to be blocked. As a result, the PMOS transistor 37 is placed in the nonconductive state. This breaks (blocks) the second reverse-flow path extending from the voltage output node 152 to the voltage input node 151 through the PMOS transistor 37.

The above-noted arrangements thus block all the reverse-flow paths extending from the voltage output node 152 to the voltage input node 151 through the PMOS transistor 37.

Referring to FIG. 3 again, the voltage input node 151 and the internal voltage line 153 are coupled to each other through a parasitic pn diode between the source node and back-gate node of the PMOS transistor 26. During the startup period in which the voltage VIN of the voltage input node 151 gradually increases from 0 V, the voltage of the internal voltage line 153 also increases together with the increase of the voltage VIN. When this happens, the voltage of the internal voltage line 153 is lower than the voltage of the voltage input node 151 by the amount equal to the voltage drop of the parasitic pn diode. Similarly, the voltage of the back-gate node of the PMOS transistor 37 rises through the pn diode made by the source node and back-gate node of the PMOS transistor 38.

A further rise in the voltage VIN causes the voltage VDD of the internal voltage line 153 to rise to the level at which the comparator 23 is able to operate. Since the divided voltage VIM increases by following the increase of the voltage VIN, the outputs S and XS of the comparator 23 become HIGH and LOW, respectively, When this happens, the gate voltage of the PMOS transistor 26 becomes LOW, so that the internal voltage line 153 is coupled to the voltage VIN through the PMOS transistor 26 in the conductive state. As a result, the comparator 23, the reference-voltage generating circuit 24, and the control circuit 21 operate with the voltage VIN supplied from the voltage input node 151.

As described above, the configuration illustrated in FIG. 3 causes the voltage VDD of the internal voltage line 153 to rise up by use of the parasitic pn diode made by the source node and back-gate node of the PMOS transistor 26 during the startup period in which the voltage VIN of the voltage input node 151 rises up. At the time the comparator 23 becomes operable with a sufficient increase of the voltage VDD, the PMOS transistor 26 is turned on. When this happens, no voltage drop occurs between the voltage VIN of the voltage input node 151 and the voltage VDD of the internal voltage line 153, thereby presenting no risk of deteriorating the power conversion efficiency of the converter circuit.

Figure 5:
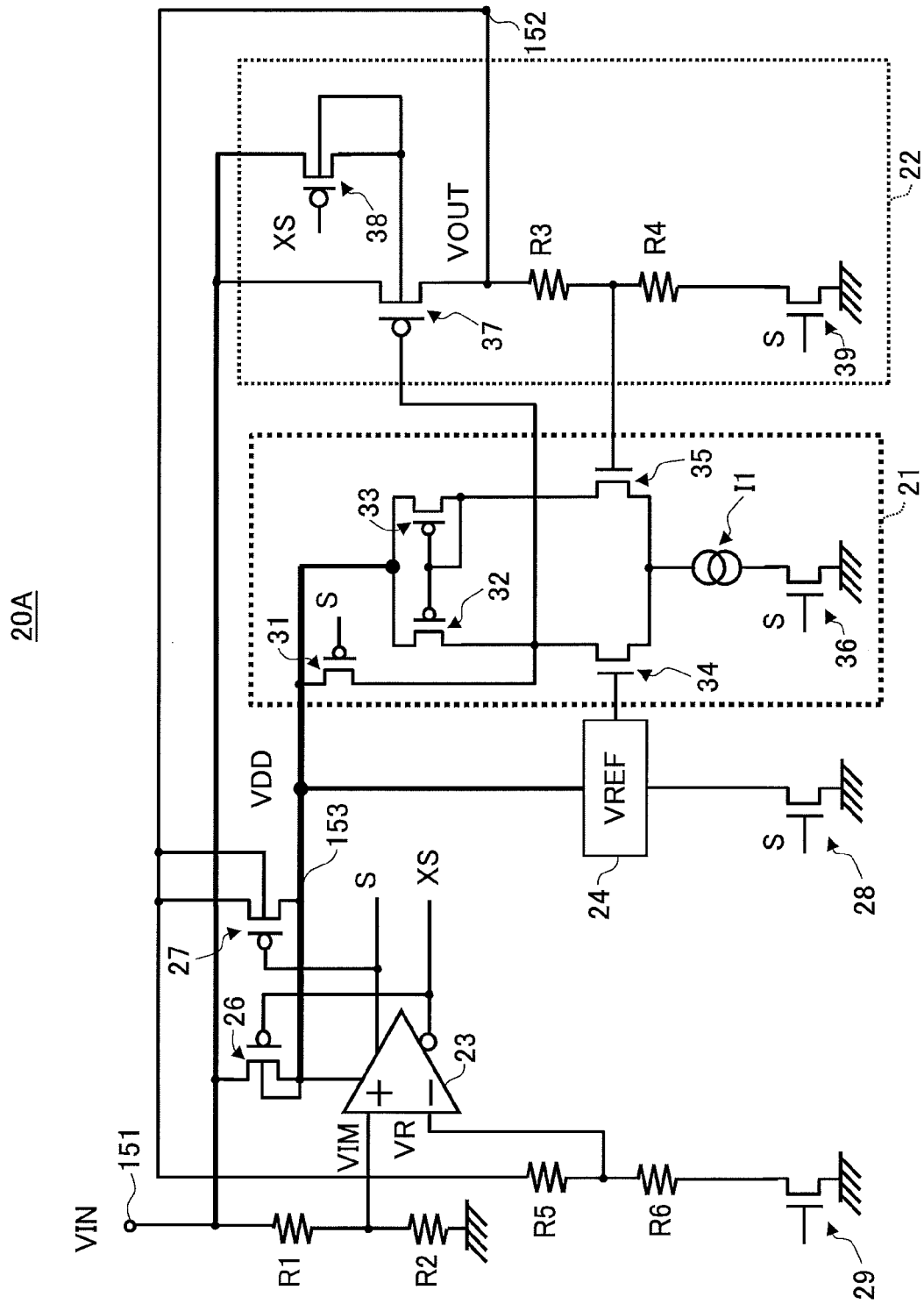
FIG. 5 is a drawing illustrating an example of the configuration of a step-down converter circuit according to a second embodiment.

FIG. 5 is a drawing illustrating an example of the configuration of a step-down converter circuit according to a second embodiment. In FIG. 5, the same or corresponding elements as those of FIG. 3 are referred to by the same or corresponding numerals, and a description thereof will be omitted as appropriate. A step-down converter circuit 20A illustrated in FIG. 5 differs from the step-down converter circuit 20 illustrated in FIG. 3 in that resistor elements R5 and R6 and an NMOS transistor 29 are provided in place of the reference voltage source 25.

In the step-down converter circuit 20A illustrated in FIG. 5, the comparator 23 compares the voltage obtained by dividing the voltage VIN of the voltage input node 151 by use of the resistor elements R1 and R2 with the voltage obtained by dividing the voltage VOUT of the voltage output node 152 by use of the resistor elements R5 and R6. The comparator 23 changes the outputs S and XS from the first state to the second state when the voltage VIN of the voltage input node 151 becomes lower than the voltage VOUT of the voltage output node 152. Namely, the comparator 23 sets the outputs S and XS to the first state in the case of VIN being higher than VOUT, and sets the outputs S and XS to the second states in the case of VIN being lower than VOUT. In the first states, the output S is set to HIGH, and the output XS is set to LOW. In the second states, the output S is set to LOW, and the output XS is set to HIGH.

The configuration illustrated in FIG. 5 enables the reliable switching of the voltage VDD of the internal voltage line 153 in response to a drop of the voltage VIN of the voltage input node 151 below the voltage VOUT of the voltage output node 152. This ensures the reliable operation of the comparator 23.

Figure 6:
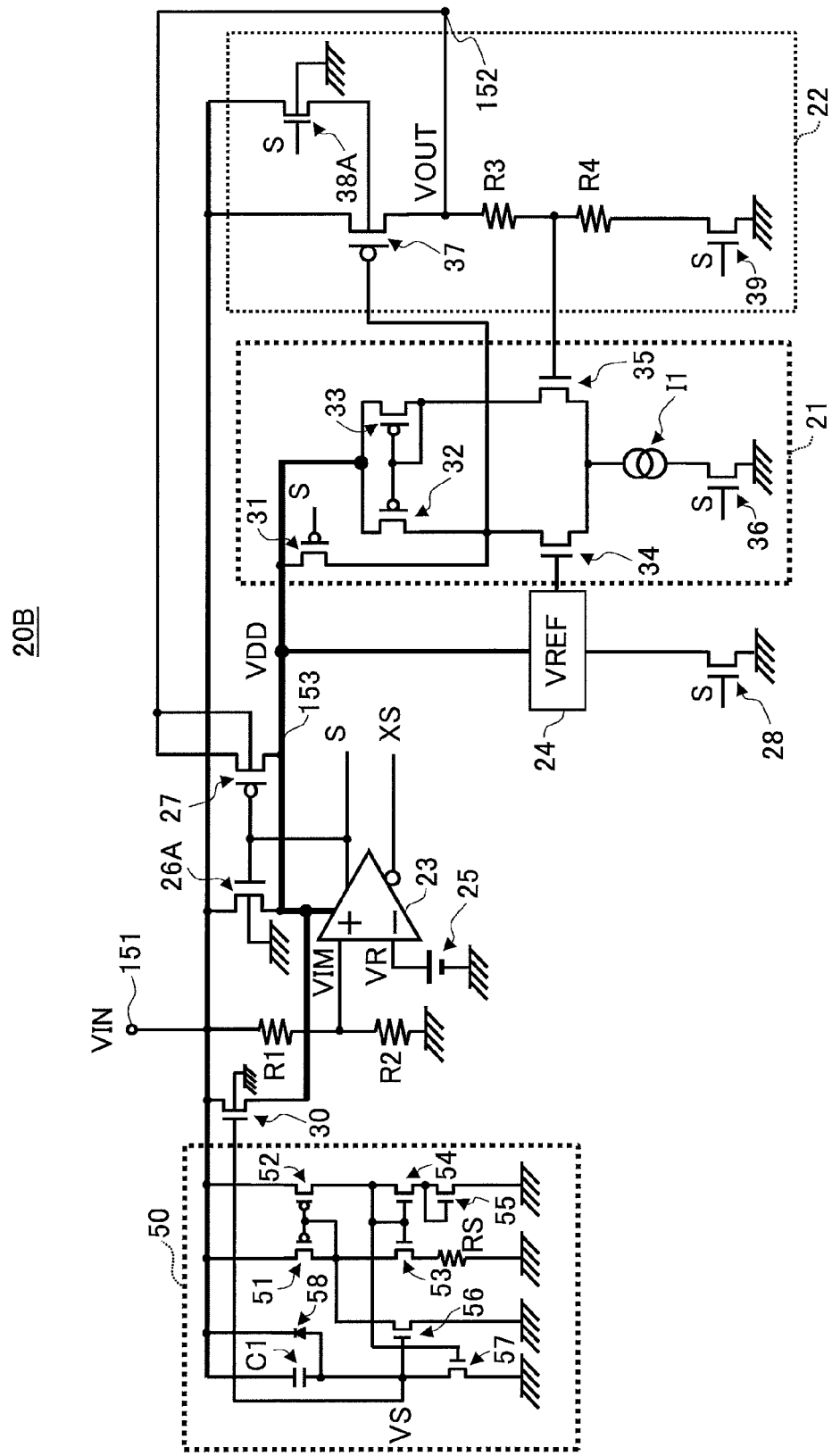
FIG. 6 is a drawing illustrating an example of the configuration of a step-down converter circuit according to a third embodiment.

FIG. 6 is a drawing illustrating an example of the configuration of a step-down converter circuit according to a third embodiment. In FIG. 6, the same or corresponding elements as those of FIG. 3 are referred to by the same or corresponding numerals, and a description thereof will be omitted as appropriate. A step-down converter circuit 20B illustrated in FIG. 6 differs from the step-down converter circuit 20 illustrated in FIG. 3 in that NMOS transistors 26A and 38A are provided in place of the PMOS transistors 26 and 38. Further, the step-down converter circuit 20B illustrated in FIG. 6 includes an NMOS transistor 30 and a startup circuit 50.

The NMOS transistor 26A has the drain node thereof coupled to the voltage input node 151 and the source node thereof coupled to the internal voltage line 153, and has the back-gate node thereof coupled to the ground, with the gate node thereof being coupled to the output S of the comparator 23. Further, the NMOS transistor 30 has the drain node thereof coupled to the voltage input node 151 and the source node thereof coupled to the internal voltage line 153, and has the back-gate node thereof coupled to the ground, with the gate node thereof being coupled to the output node of the startup circuit 50.

The startup circuit 50 includes PMOS transistors 51 and 52, NMOS transistors 53 through 57, a diode 58, a capacitor element C1, and a resistor element RS. The startup circuit 50 generates at the output node thereof a voltage that first follows the voltage of the voltage input node 151 and then drops at the time of startup of the voltage of the voltage input node 151.

A rise of the voltage VIN of the voltage input node 151 from zero causes a signal VS in the startup circuit 50 to rise due to the capacitive coupling through C1, resulting in the NMOS transistor 56 being turned on. In response, the PMOS transistors 51 and 52 become conductive, so that a circuit constituted by the PMOS transistors 51 and 52 and the NMOS transistors 53 and 54 operates as a current mirror circuit. The current mirror circuit performs feedback control on the amount of electric current such that the amount of electric current in the stable state is equal to a fixed current amount determined by the resistor element RS and the threshold voltage of the NMOS transistor 55. With the stable fixed amount of electric current flowing through the current mirror circuit, no current flows toward the branch leading to the NMOS transistor 56. Further, the potential of the signal VS drops to zero because the NMOS transistor 57 is connected to no path through which a direct current flows from the voltage VIN. Namely, the potential of the signal VS rises together with the voltage VIN before the start of operation of the current mirror circuit, and drops to zero after the stabilization of the operation of the current mirror circuit.

The signal VS as described above is output from the output node of the startup circuit 50, and is applied to the gate node of the NMOS transistor 30. With this arrangement, the signal VS set in the HIGH state prior to the stabilization of operation of the current mirror circuit causes the NMOS transistor 30 to be conductive, and the signal VS set in the LOW state upon the stabilization of operation of the current mirror circuit causes the NMOS transistor 30 to be nonconductive. In this manner, the NMOS transistor 30 temporarily becomes conductive during the rise of the voltage VIN, thereby supplying voltage from the voltage input node 151 to the internal voltage line 153.

The comparator 23 starts operating after the startup circuit 50 and the NMOS transistor 30 supply voltage to the internal voltage line 153, thereby performing the same or similar operations as in the case of the step-down converter circuit 20 illustrated in FIG. 3. The back-gate nodes of the NMOS transistor 26A and the NMOS transistor 38A are coupled to the ground, so that no electric current flows back from the voltage VOUT or voltage VDD to the voltage VIN.

A circuit similar to the startup circuit is typically used for other purposes in electronic equipment. Such a circuit may be used for dual purposes as the startup circuit 50. In comparison with the step-down converter circuit 20 illustrated in FIG. 3, the replacement of the PMOS transistors 26 and 38 with the NMOS transistors enables the reduction of transistor size, thereby contributing to miniaturization of the step-down converter circuit.

Figure 7:
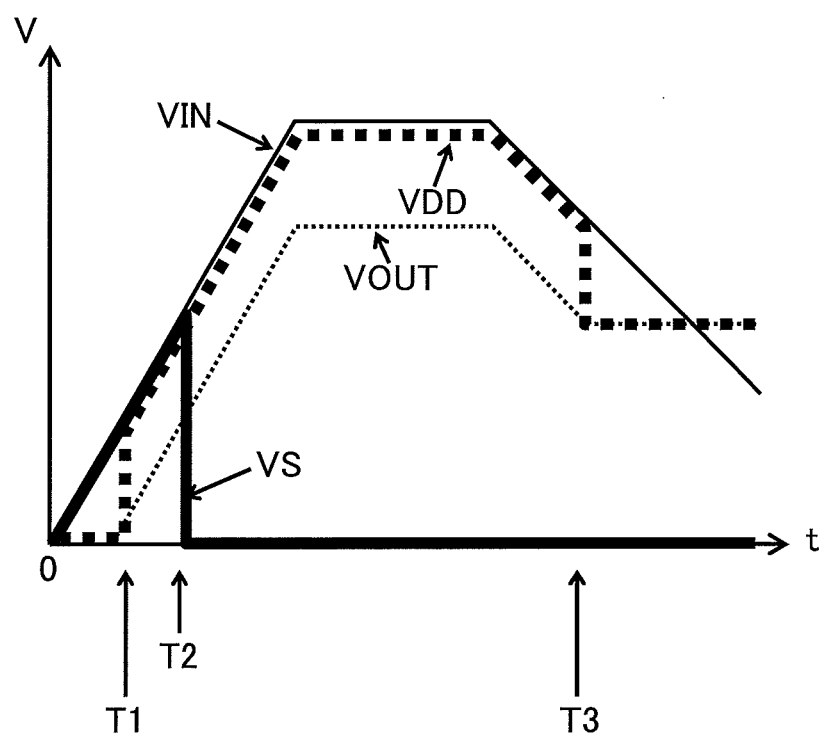
FIG. 7 is a drawing illustrating the operation of the step-down converter circuit illustrated in FIG. 6.

FIG. 7 is a drawing illustrating the operation of the step-down converter circuit illustrated in FIG. 6. The horizontal axis represents time, and the vertical axis represents voltage. FIG. 7 illustrates voltage waveforms observed when the voltage VIN of the voltage input node 151 starts rising at time 0, reaches a certain voltage level, and then drops. The voltage of the signal VS rises by following the rise of the voltage VIN. At time T1, the NMOS transistor 30 becomes conductive, so that the voltage VDD of the internal voltage line 153 follows the voltage VIN of the voltage input node 151. At time T2, the voltage of the signal VS drops, thereby causing the NMOS transistor 30 to be nonconductive. The comparator 23 has already started operating by this point in time to make the NMOS transistor 26A conductive, so that the voltage VDD of the internal voltage line 153 still continues to follow the voltage VIN.

After the voltage VIN of the voltage input node 151 subsequently reaches the constant voltage level, the voltage VOUT of the voltage output node 152 also maintains a constant voltage level lower than the voltage VIN due to control by the control circuit 21 in the step-down converter circuit 20B.

After this, the voltage VIN of the voltage input node 151 may drop due to an environmental change or the like. In response, the output S of the comparator 23 changes from HIGH to LOW, thereby making the NMOS transistor 26A nonconductive and making the PMOS transistor 27 conductive. With this, the voltage VDD of the internal voltage line 153 becomes equal to the voltage VOUT of the voltage output node 152. Even if the voltage VIN of the voltage input node 151 subsequently drops further, the voltage VOUT of the voltage output node 152 and the voltage VDD of the internal voltage line 153 do not drop with the dropping voltage VIN, but stay at the constant voltage level.

Figure 8:
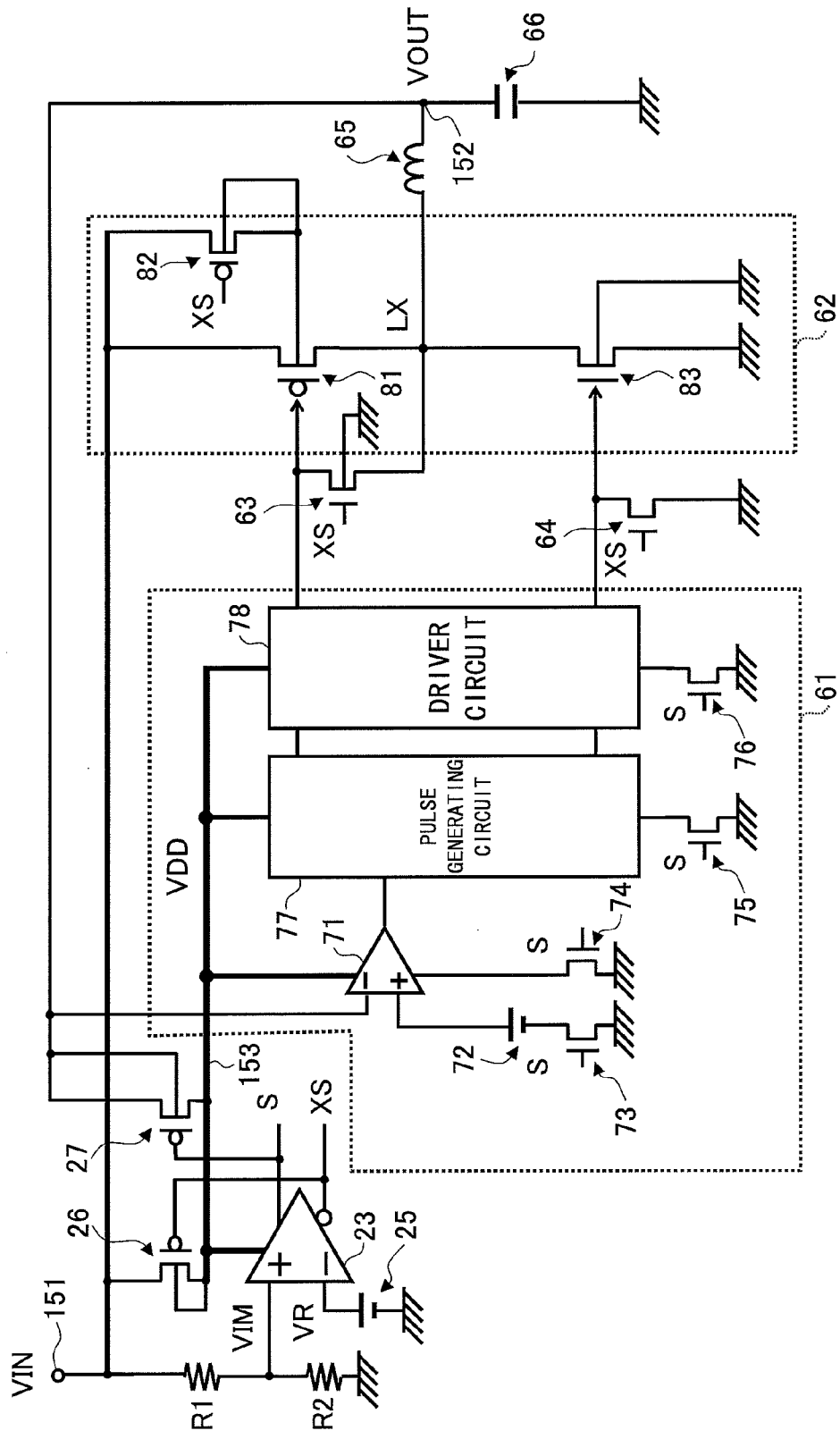
FIG. 8 is a drawing illustrating an example of the configuration of a step-down converter circuit according to a fourth embodiment.

FIG. 8 is a drawing illustrating an example of the configuration of a step-down converter circuit according to a fourth embodiment. In FIG. 8, the same or corresponding elements as those of FIG. 3 are referred to by the same or corresponding numerals, and a description thereof will be omitted as appropriate. A step-down converter circuit 20C illustrated in FIG. 8 differs from the step-down converter circuit 20 illustrated in FIG. 3 in that a control circuit 61 and an output circuit 62 are provided in place of the control circuit 21 and the output circuit 22. Further, MOS transistors 63 and 64, an inductor element 65, and a capacitor element 66 are also provided.

The control circuit 61 includes a comparator 71, a voltage source 72, NMOS transistors 73 through 76, a pulse generating circuit 77, and a driver circuit 78. The output circuit 62 includes a PMOS transistor 81, a PMOS transistor 82, and an NMOS transistor 83. The inductor element 65 is disposed between the drain node of the PMOS transistor 81 and the voltage output node 152. The capacitor element 66 is disposed between the voltage output node 152 and the ground. The NMOS transistor has the drain node thereof coupled to a connection point LX between the drain node of the NMOS transistor 81 and the inductor element 65, and has the source node thereof coupled to the ground.

The power voltage of the control circuit is the voltage VDD of the internal voltage line 153. The comparator 71 of the control circuit 61 compares the voltage VOUT of the voltage output node 152 with a reference voltage generated by the voltage source 72 to produce an output signal responsive to the voltage difference. In response to the output signal of the comparator 71, the pulse generating circuit 77 generates a pulse signal for controlling whether to turn on or off the PMOS transistor 81 and the NMOS transistor 83 of the output circuit 62. In response to this pulse signal, the driver circuit 78 controls the gate voltages of the PMOS transistor 81 and the NMOS transistor 83 of the output circuit 62. With this arrangement, the energy accumulated in the inductor element 65, i.e., the amount of electric current flowing through the inductor element 65, is adjusted to a predetermined value. The voltage VOUT of the voltage output node 152 is thus adjusted such as to be equal to the reference voltage of the voltage source 72.

With the outputs S and XS of the comparator 23 being set in the first state, i.e., the output S being HIGH and the output XS being LOW, the control circuit 61 operates with the voltage VIN of the voltage input node 151 to control the operation of the output circuit 62. With the outputs S and XS of the comparator 23 being set in the second state, i.e., the output XS being HIGH and the output S being LOW, the control circuit 61 receives the voltage VOUT of the voltage output node 152 as a power voltage, but stops operating because the NMOS transistors 73 through 76 receiving the output S of the comparator 23 at the gate nodes thereof become nonconductive.

The NMOS transistor 63 is disposed between the gate node of the PMOS transistor 81 and the node LX, and receives the output XS of the comparator 23 at the gate node thereof. The NMOS transistor 64 is disposed between the gate node of the NMOS transistor 83 and the ground, and receives the output XS of the comparator 23 at the gate node thereof. When the output XS becomes HIGH in the second state of the outputs of the comparator 23, the NMOS transistors 63 and 64 become conductive, and the PMOS transistor 81 and the NMOS transistor 83 become nonconductive.

Figure 9:
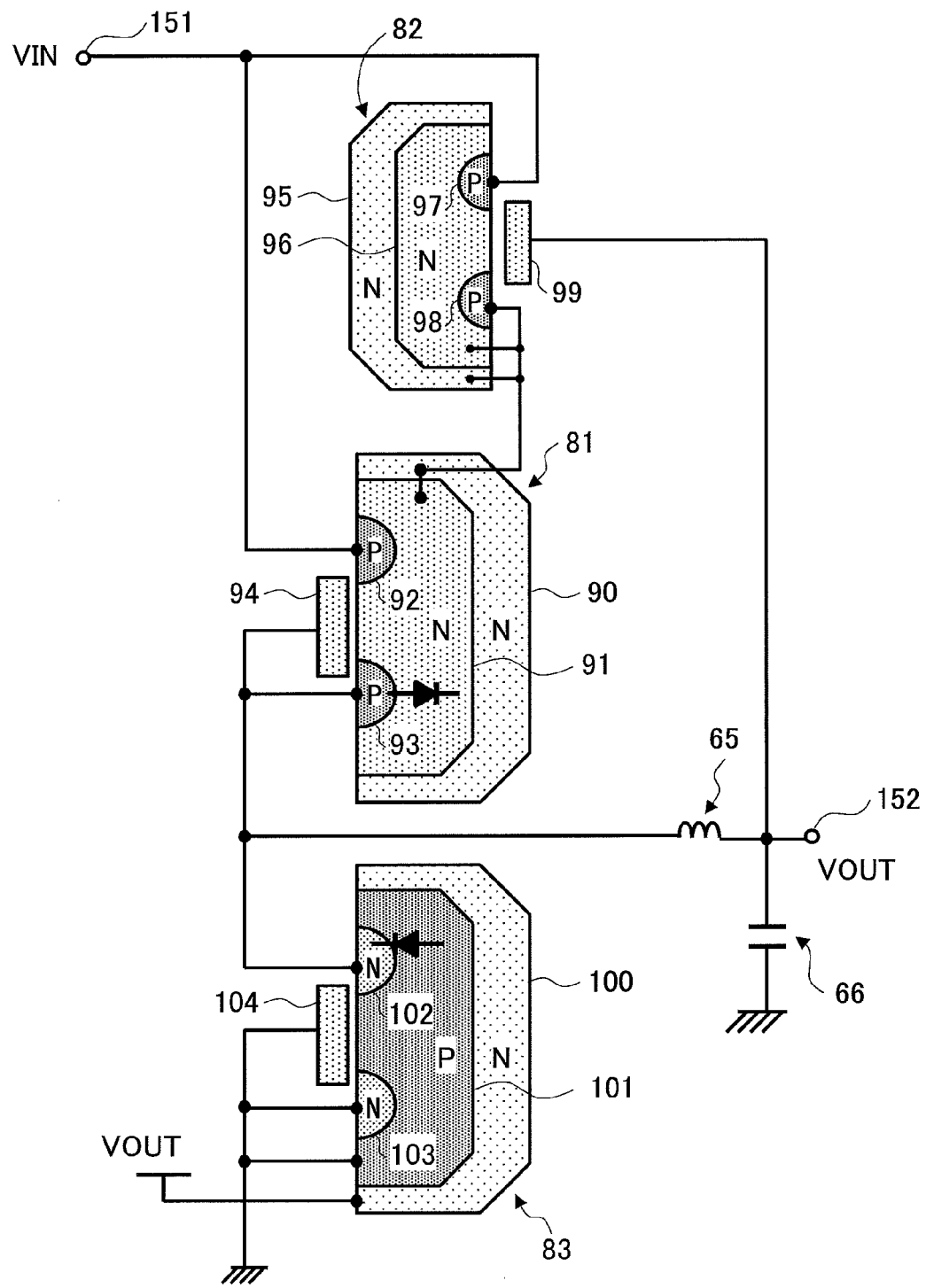
FIG. 9 is a drawing illustrating the state in which the reverse-flow path extending from a voltage output node to a voltage input node through a PMOS transistor is blocked.

FIG. 9 is a drawing illustrating the state in which the reverse-flow path extending from the voltage output node 152 to the voltage input node 151 through the PMOS transistor 81 is blocked. In FIG. 9, the illustration of a p-type substrate is omitted for the sake of convenience. The PMOS transistor 81 includes an n-well 90, an n-well 91, a source (p-type diffusion layer) 92, and a drain (p-type diffusion layer) 93 formed in the p-type substrate, and also includes a gate 94. The PMOS transistor 82 includes an n-well 95, an n-well 96, a source (p-type diffusion layer) 97, and a drain (p-type diffusion layer) 98 formed in the p-type substrate, and also includes a gate 99. The NMOS transistor 83 includes an n-well 100, an p-well 101, a drain (n-type diffusion layer) 102, and a source (n-type diffusion layer) 103 formed in the p-type substrate, and also includes a gate 104.

FIG. 9 illustrates the state of the PMOS transistor 81, the PMOS transistor 82, and the NMOS transistor 83 in the case of the outputs S and XS of the comparator 23 being in the second state. With the outputs S and XS of the comparator 23 (see FIG. 3) being in the second state, the gate voltage of the PMOS transistor 81 and the gate voltage of the PMOS transistor 82 are both set to the voltage VOUT. Further, the gate voltage of the NMOS transistor 83 is set to the ground potential.

The gate voltage of the PMOS transistor 82 set in the voltage VOUT causes the PMOS transistor 82 to be nonconductive. This arrangement blocks the path through which electric current flows back from the drain 93 of the PMOS transistor 81 to the voltage input node 151 through the pn junction made by the drain 93 and the n-well 91 of the PMOS transistor 81 and through the PMOS transistor 82. Namely, this breaks (blocks) the first reverse-flow path extending from the voltage output node 152 to the voltage input node 151 through the PMOS transistor 81.

Further, the gate voltage of the PMOS transistor 81 set in the potential of the node LX, i.e., set in the voltage VOUT, causes a channel between the source 92 connected to the voltage VIN and the drain 93 connected to the voltage VOUT to be blocked. As a result, the PMOS transistor 81 is placed in the nonconductive state. This breaks (blocks) the second reverse-flow path extending from the voltage output node 152 to the voltage input node 151 through the PMOS transistor 81.

The above-noted arrangements thus block all the reverse-flow paths extending from the voltage output node 152 to the voltage input node 151 through the PMOS transistor 81. Further, the NMOS transistor 83 is also nonconductive because the gate voltage of the NMOS transistor 83 is set to the ground. There is thus no risk of leakage of the voltage VOUT from the voltage output node 152.

Figure 10:
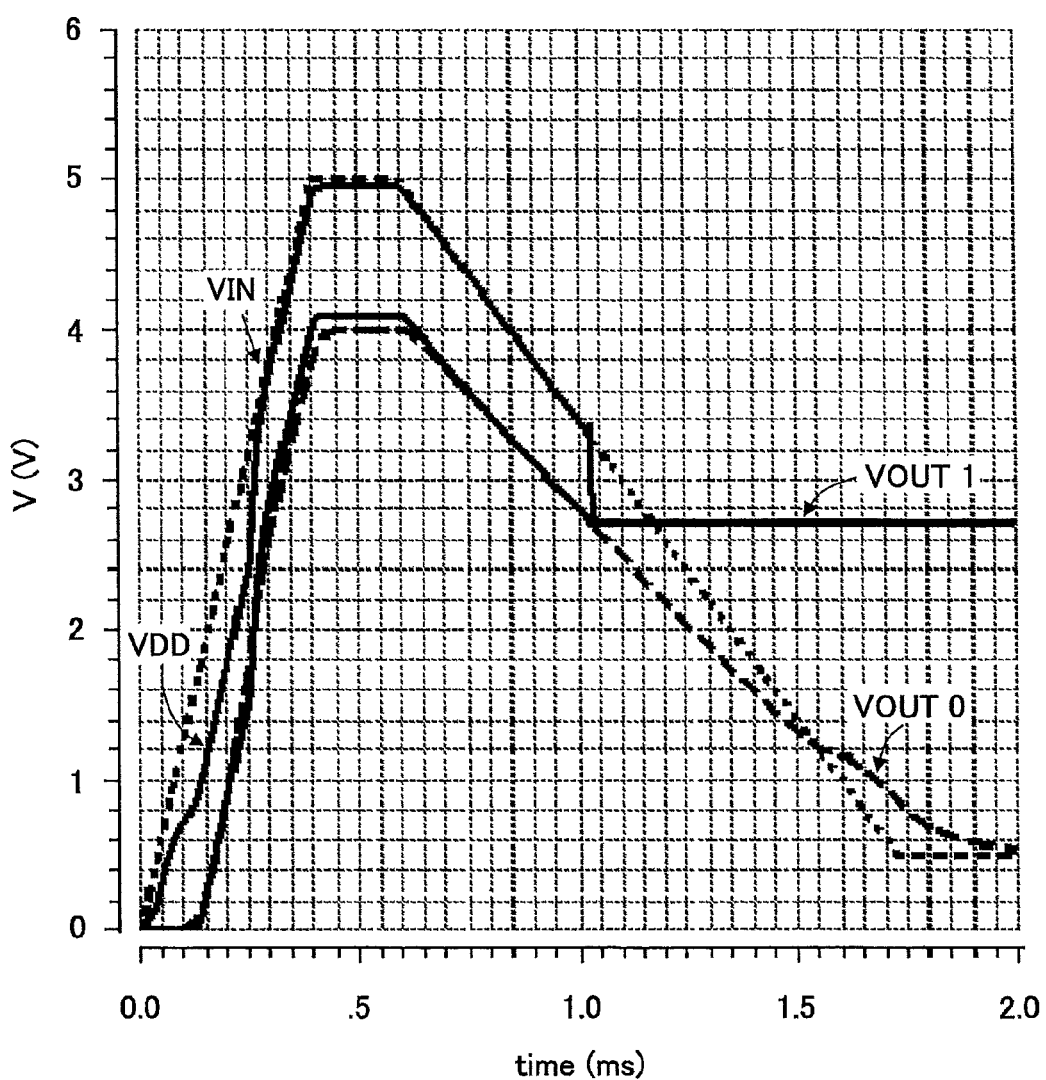
FIG. 10 is a drawing illustrating the results of simulation with respect to the operations of the step-down converter circuit illustrated in FIG. 8.

FIG. 10 is a drawing illustrating the results of simulation with respect to the operations of the step-down converter circuit illustrated in FIG. 8. The horizontal axis represents time, and the vertical axis represents voltage. In this simulation, the voltage VIN of the voltage input node 151 rises from 0 V to 5 V, and stays at 5 V for a certain duration, followed by dropping close to 0 V. Such temporal changes in the voltage of the voltage output node 152 are illustrated as VOUT1 Further, temporal changes in the output voltage obtained by use of a normal switching regulator are illustrated as VOUT0.

It may be noted that the reference potential of the control circuit 61 in this simulation is set such that the voltage VOUT is equal to 4 V in the case of the voltage VIN being 5 V. Further, the ratio of resistance values of the resistor elements R1 and R2 are 3:4 such that the signals S and XS are inverted at the time the voltage VIN drops below 3.5 V. The voltage of the reference voltage source 25 is set to 2 V.

The dropping of the voltage VIN of the voltage input node 151 causes the outputs of the comparator 23 to be placed in the second state at around 1.0 ms, so that the voltage VDD of the internal voltage line 153 becomes equal to the voltage VOUT1 of the voltage output node 152. A further drop in the voltage VIN of the voltage input node 151 causes the output voltage VOUT0 of the normal switching regulator to drop together, but the voltage VOUT1 of the voltage output node 152 and the voltage VDD of the internal voltage line 153 stay at the constant voltage level.

Figure 11:
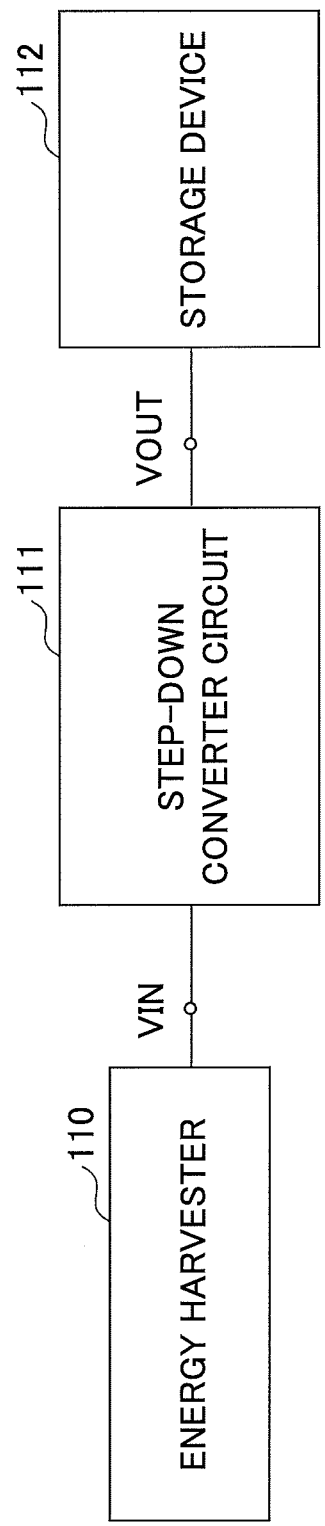
FIG. 11 is a drawing illustrating an example of the configuration of a power supply module to which the step-down converter circuit is applied.

FIG. 11 is a drawing illustrating an example of the configuration of a power supply module to which the step-down converter circuit is applied. The power supply module illustrated in FIG. 11 includes an energy harvester 110, a step-down converter circuit 111, and a storage device 112. The energy harvester 110 may be an indoor photovoltaic cell or the like, and converts energy obtained from the surrounding environment into electric power. The step-down converter circuit 111, which may be the step-down converter circuit illustrated in FIG. 3, FIG. 5, FIG. 6 or FIG. 8, generates a step-down voltage VOUT at the voltage output node thereof by stepping down the voltage VIN generated by the energy harvester 110. The storage device 112, which may be a lithium secondary battery, is charged by the step-down voltage VOUT generated by the step-down converter circuit 111. The step-down converter circuit 111 is provided with the function to prevent the reverse-flow of electric current as was described in connection with the first through fourth embodiments. Even when the voltage VIN generated by the energy harvester 110 drops, the step-down converter circuit 111 prevents reverse flow from the storage device 112, thereby preventing the accumulated energy of the storage device 112 from being lost.

According to at least one embodiment, a step-down converter circuit is provided that prevents reverse flow with satisfactory power conversion efficiency.

Further, the present invention is not limited to these embodiments, but various variations and modifications may be made without departing from the scope of the present invention.

The step-down converter circuits illustrated in FIG. 3, FIG. 5, FIG. 6, and FIG. 8 may be used in combination. For example, the configuration in which the voltage VOUT is subjected to comparison by the comparator 23 as illustrated in FIG. 5 may be applied to the step-down converter circuit illustrated in FIG. 6 or FIG. 8. As a further example, the configuration that uses the startup circuit illustrated in FIG. 6 may be applied to the step-down converter circuit illustrated in FIG. 8.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A circuit for generating a stepped-down voltage, comprising:
   a first PMOS transistor having a source node thereof coupled to a voltage input node, and having a drain node thereof coupled to a voltage output node;
   a control circuit configured to operate with a voltage of an internal voltage line and to control a gate voltage of the first PMOS transistor;
   a comparator configured to operate with the voltage of the internal voltage line and to cause an output thereof to change from a first state to a second state in response to a drop of voltage of the voltage input node;
   a switch circuit including:
      a second PMOS transistor having a source node thereof coupled to the voltage input node, having a drain node and back-gate node thereof coupled to the internal voltage line, and having a gate node thereof coupled to the output of the comparator; and
      a third PMOS transistor having a source node and back-gate node thereof coupled to the voltage output node, having a drain node thereof coupled to the internal voltage line, and having a gate node thereof coupled to an inversion of the output of the comparator,
      the switch circuit configured to connect the voltage input node to the internal voltage line through the second PMOS transistor to set the internal voltage line substantially at the same voltage as the voltage input node when the output of the comparator is in the first state, and configured to connect the voltage output node to the internal voltage line through the third PMOS transistor to set the internal voltage line substantially at the same voltage as the voltage output node when the output of the comparator is in the second state; and
   a block circuit configured to block a reverse-flow path from the voltage output node to the voltage input node through the first PMOS transistor when the output of the comparator is in the second state.

2. The circuit as claimed in claim 1, wherein the comparator is configured to change the output thereof from the first state to the second state in response to dropping of the voltage of the voltage input node below the voltage of the voltage output node.

3. The circuit as claimed in claim 1, further comprising:
   an inductor disposed between the voltage output node and the drain node of the first PMOS transistor;
   a capacitor disposed between the ground and the voltage output node; and
   a first NMOS transistor having a drain node thereof coupled to a connection point between the inductor and the drain node of the first PMOS transistor, and having a source node thereof coupled to the ground,
   wherein the control circuit is configured to adjust a current flowing through the inductor by controlling a gate voltage of the first PMOS transistor and a gate voltage of the first NMOS transistor.

4. A power supply module, comprising:
   an energy harvester;
   a circuit configured to receive a voltage generated by the energy harvester at a voltage input node and to generate a stepped-down voltage at a voltage output node by stepping down a voltage of the voltage input node;
   a storage device coupled to the voltage output node,
   wherein the circuit includes:
   a PMOS transistor having a source node thereof coupled to the voltage input node, and having a drain node thereof coupled to the voltage output node;
   a control circuit configured to operate with a voltage of an internal voltage line and to control a gate voltage of the PMOS transistor;
   a comparator configured to operate with the voltage of the internal voltage line and to cause an output thereof to change from a first state to a second state in response to a drop of voltage of the voltage input node;
   a switch circuit including:
      a second PMOS transistor having a source node thereof coupled to the voltage input node, having a drain node and back-gate node thereof coupled to the internal voltage line, and having a gate node thereof coupled to the output of the comparator; and
      a third PMOS transistor having a source node and back-gate node thereof coupled to the voltage output node, having a drain node thereof coupled to the internal voltage line, and having a gate node thereof coupled to an inversion of the output of the comparator,
      the switch circuit configured to connect the voltage input node to the internal voltage line through the second PMOS transistor to set the internal voltage line substantially at the same voltage as the voltage input node when the output of the comparator is in the first state, and configured to connect the voltage output node to the internal voltage line through the third PMOS transistor to set the internal voltage line substantially at the same voltage as the voltage output node when the output of the comparator is in the second state; and
   a block circuit configured to block a reverse-flow path from the voltage output node to the voltage input node through the PMOS transistor when the output of the comparator is in the second state.

5. A method of controlling a circuit for generating a stepped-down voltage which includes a first PMOS transistor having a source node thereof coupled to a voltage input node, and having a drain node thereof coupled to a voltage output node, a control circuit configured to operate with a voltage of an internal voltage line and to control a gate voltage of the first PMOS transistor, a comparator configured to operate with the voltage of the internal voltage line and to cause an output thereof to change from a first state to a second state in response to a drop of voltage of the voltage input node, and a switch circuit configured to connect a selected one of the voltage input node and the voltage output node to the internal voltage line, wherein the switch circuit includes a second PMOS transistor having a source node thereof coupled to the voltage input node, having a drain node and back-gate node thereof coupled to the internal voltage line, and having a gate node thereof coupled to the output of the comparator, and a third PMOS transistor having a source node and back-gate node thereof coupled to the voltage output node, having a drain node thereof coupled to the internal voltage line, and having a gate node thereof coupled to an inversion of the output of the comparator, the method comprising:

connecting the voltage input node to the internal voltage line through the second PMOS transistor of the switch circuit to set the internal voltage line substantially at the same voltage as the voltage input node when the output of the comparator is in the first state;

connecting the voltage output node to the internal voltage line through the third PMOS transistor of the switch circuit to set the internal voltage line substantially at the same voltage as the voltage output node when the output of the comparator is in the second state; and blocking a reverse-flow path from the voltage output node to the voltage input node through the first PMOS transistor when the output of the comparator is in the second state.

* * * * *